May 26, 1959 W. A. BARNES 2,888,614

ELECTRICAL ASSEMBLIES AND APPARATUS FOR PRODUCING SAME

Filed Feb. 4, 1955 2 Sheets-Sheet 1

INVENTOR.
WILLIAM A. BARNES
BY
Woodling and Krost
Attys.

May 26, 1959 W. A. BARNES 2,888,614
ELECTRICAL ASSEMBLIES AND APPARATUS FOR PRODUCING SAME
Filed Feb. 4, 1955
2 Sheets-Sheet 2
Fig. 7
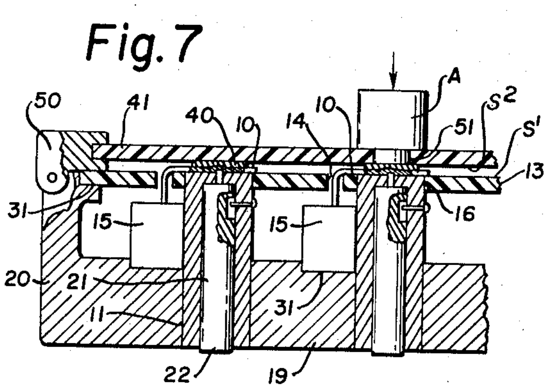
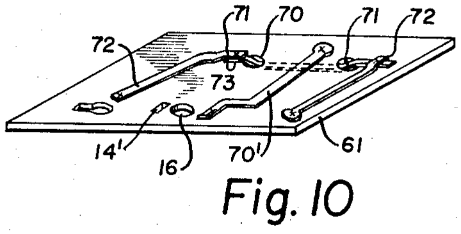
Fig. 10
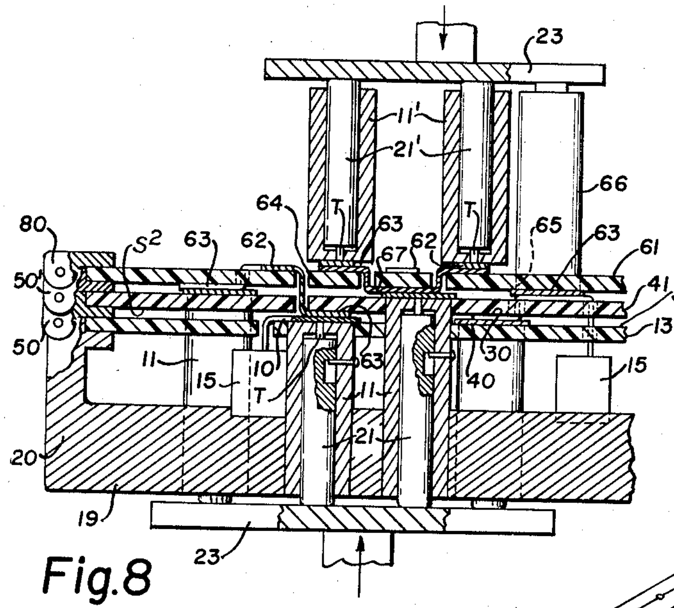
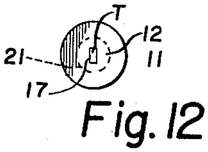
Fig. 12
Fig. 8
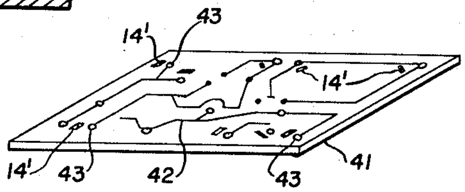
Fig. 9
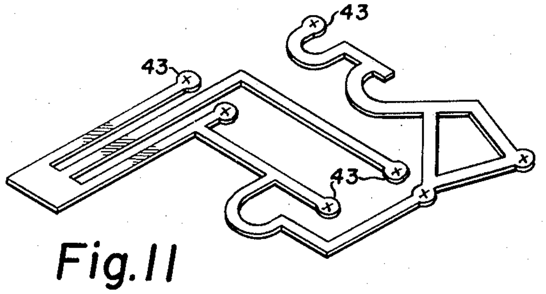
Fig. 11
INVENTOR.
WILLIAM A. BARNES
BY
Woodling and Krost
Attys 2,888,614

ELECTRICAL ASSEMBLIES AND APPARATUS FOR PRODUCING SAME

William A. Barnes, Utica, N.Y., assignor, by mesne assignments, to Kelsey-Hayes Company, Detroit, Mich., a corporation of Delaware Application February 4, 1955, Serial No. 486,059

11 Claims. (Cl. 317—101)

This invention relates broadly to the art of providing effective connections between electrical conductors or terminals in electrical assemblies by cold pressure welding.

An important object of the invention is the provision of electrical assemblies having a plurality of pairs of complementary electrical terminals or conductors, which pairs can all be simultaneously connected to form a complete assembly with but one stroke or welding effort. This finds uses in many fields, such as in the making of electrical connections on insulating panels or mounting boards of electrical apparatus, radio and television sets where several electrical components or conductors are to be connected in a network of electrical circuits, or where electrical conductors are to be permanently connected in inaccessible places within a product. Such circuits or conductors may be made of copper and/or aluminum coatings deposited upon rigid insulation panels or may be made of heavy copper or aluminum foil attached to the panels or to electrical components or subassemblies. The connection of electrical components or conductors to such circuits or to the terminals thereof has heretofore been accomplished by tedious soldering or step-by-step "wire wrap" connections such as are used in electrical and telephone laboratories, but this is not entirely satisfactory due to the time consuming element and to the lack of permanence of the connections.

It is therefore an important object of the invention to provide apparatus by which electrical conductors or terminals can be supported and given proper surface treatment for welding while in final assembled position and which can also be connected by welding while in the same position and before any contamination of the prepared surfaces can take place; the welding means being arranged to contribute to the support of the terminals or conductors during their treatment and/or welding.

Another object of the invention is to make such conductors from heavy aluminum or copper foil and assemble them upon an insulating mounting panel, board or the like, for the attachment of the terminals of these conductors to the terminals of electrical components or to other conductors or circuits by cold pressure welding.

A further object is the provision of an assembly including one or more insulating panels or boards to which the several electrical components or conductors are connected and can be easily handled as a unit for assembly with other units or instruments.

Still another object is the provision of an assembly including two or more of such panels which may be connected in sandwich form and which have provision for proper conductor or terminals preparation and for making intricate crossover electrical connections with cold pressure welding apparatus.

A further object is the provision of means for bending the terminals into a substantially common plane in situ in their proper assembled positions in an assembly and whereby surface preparation may be simultaneously or subsequently performed upon such terminals as a group in very inaccessible places.

Other objects and advantages of the invention will become apparent during the course of the following description. In the accompanying drawings forming a part of the description and wherein like numerals are employed to designate like parts throughout the several views:

Figure 7 is a similar view of an assembly including a pair of mounting panels showing the use of a back-up anvil for one pair of the conductors;

Figure 8 is a vertical sectional view of an assembly including three mounting panels with variously arranged conductors and welding equipment to weld complementary conductors between the layers of a sandwich assembly;

Figure 9 is a perspective view of a panel having a network of circuits or conductors mounted thereby for the welding of their terminals to other separate conductors or to conductors mounted by a second panel;

Figure 10 is a perspective view representing an assembly panel or a subassembly showing the manner of making crossover connections;

Figure 11 is a perspective view of an electrical circuit or conductor stamped from foil and ready to be mounted on a mounting panel; and Figure 12 is an elevation of the welding end of a welding instrument showing the shape of the indentor or welding tap.

One of the main purposes of this invention is to provide electrical conductors from aluminum and/or copper foil or metal conductor coatings and to cold weld one or more pairs of such conductors with pressure alone into a single unit or assembly with but a single welding effort. To accomplish this welding effectively, requires thorough preparation and cleaning of the surfaces of the conductors to be welded while in their ultimate welding positions whereby the subsequent welding can immediately take place in situ to prevent blighting and contamination of such surfaces by distortion or oxidation as may be caused by subsequent delayed handling of the material in positioning it for welding. With this introduction, these accomplishments will be better understood from a description of and reference to the drawings wherein several embodiments of the invention are shown for purposes of illustration and not for limitation.

Figure 1:
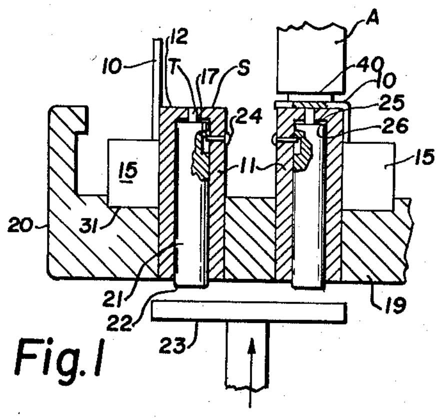
Figure 1 is a vertical sectional view of the welding apparatus showing the welding instruments arranged with their upper ends in a uniform plane to conjointly form a work supporting surface, and with components arranged with terminals before and after bending.

While many modifications may be made, for the present, it appears that the invention can best be accomplished in apparatus shown in the drawings and which provides a supporting surface "S" forming a smooth coplanar surface upon which one or more thick foil conductors or terminals 10 may be thoroughly cleaned, and pressed so to speak, into a perfectly flat condition in a single or uniform plane ready for immediate welding. For this purpose, the supporting surface "S" may be constituted by one or a plurality of welding means spaced or grouped in any desired manner, as for example as shown in Figure 1, and which welding means includes a series or group of vertical guide tubes 11 all arranged with their upper closed ends 12 disposed more or less closely together in a uniform plane for the sole support of the conductors 10, as shown in Figure 1. In some cases, this supporting surface may include a mounting panel or board 13 of substantially rigid insulating material, as for example, plastic, Bakelite or rigid cardboard material such as is used in radio and television panels and upon which many of the components of such sets are mounted and/or assembled with the usual instrument or cabinet therefor. It is proposed that such panels be provided with openings or apertures 14 for the assembly of the foil conductors or terminals 10 of electrical components 15, and openings 16 for the snug reception of the upper closed ends 12 of the welding tubes 11 so that these upper closed ends are flush with the top surface of the panel to conjointly form a coplanar work supporting surface "S′" as in Figure 2. The upper closed end of each guide tube is provided with a relatively small opening 17 which is normally filled by the welding tip or projection "T" of a welding plunger to be presently described. The welding surface of the rectangular welding tip "T" is normally disposed flush with the supporting surface "S" so as not to materially break the continuity thereof. The lower ends 18 of these guide tubes are secured in openings in the bottom 19 of a frame 20.

Figure 6:
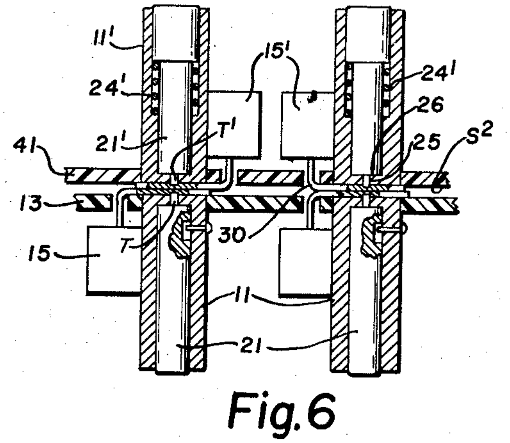
Figure 6 is a vertical sectional view of a pair of mounting panels in position showing the welding of conductors of each with welding instruments associated with each panel.

A welding plunger 21 is freely slidably mounted in each guide tube, preferably with the lower end 22 of the plunger projecting slightly below the lower end of its respective guide tube in position to be engaged by pressure applying means 23 whereby all of these plungers or any predetermined number of them can be simultaneously actuated to perform all or several of the welding operations in the assembly with one welding effort. The plungers which move upwardly to perform a welding operation are gravitationally supported in an inactive lowered position by suitable stops 24 on their respective guide tubes and may be actuated or moved upwardly in the guide tubes to perform welding operations, by any suitable pressure applying means. Inverted welding apparatus which may be associated with the top of the electrical assembly as shown in Figures 6 and 8 may be substantially of the same construction as the welding apparatus just described to include a guide tube 11′ for slidably mounting a welding plunger 21′ held with its welding tip "T" in the same plane as the supporting surface "$S^2$" and with the uppermost end of the plunger held above the end of the guide tube by means of a spring 24′ anchored to the guide sleeve and disposed about a reduced portion of the plunger as shown in Figure 6 and described in my copending application Serial No. 472,351. Such spring will retain the upper ends of the upper set of plungers projected above the guide tubes in position to be simultaneously engaged and moved downwardly to perform a welding operation. It will be noted that the closed ends of the guide tubes which enclose or house the rectangular welding tips of the welding plungers provide stop shoulders 25 which are adapted to be engaged by shoulders 26 of the plungers to limit the extent of welding movement of these plungers. The stop shoulders are so arranged and the height or axial extent of the indentor tips are controlled so that the welding movements of the plungers and indentors are controlled so that the welding movements of the plungers and indentors are sufficient only to indent and cold weld superimposed foil conductors or terminals without punching holes therein. The dimensions and shape of the indentor welding tips and the extent of their welding movement are critical as is well understood in the art of cold pressure welding. In place of the upper welding plungers, or in places where they will not fit in holes in the panels between close wiring of some electrical assemblies, one or more anvils "A" may be employed to abut the upper surface of the upper panel to back it up or may be extended through an opening in this panel in registration with the superimposed contacts or conductors to back them up against a welding pressure as shown in Figures 1 and 7. These anvils may be moved to and from welding positions by any suitable means.

Figure 2:
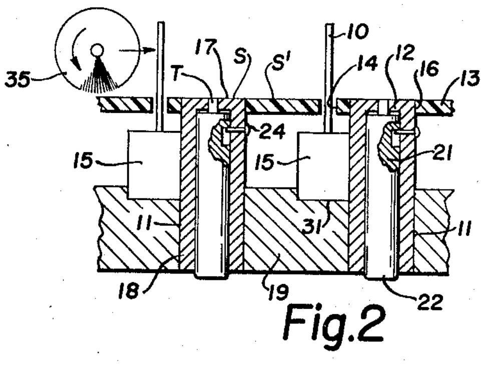
Figure 2 is a similar view and with a panel of the electrical assembly arranged with its work supporting surface arranged flush with the upper ends or welding instruments to conjointly form therewith a work support, and with the terminals of components arranged upright prior to bending and cleaning with the bending instrument shown in this view.
Figure 3:
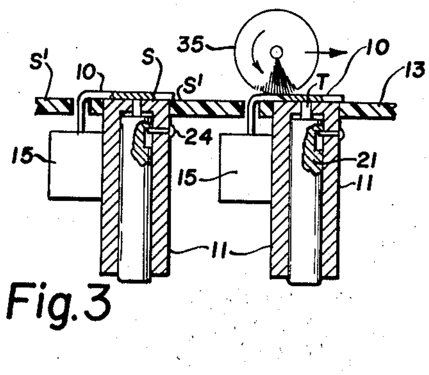
Figure 3 is a view similar to Figure 2 showing the bending instrument in the act of bending and cleaning the terminals.

The panel 13, when employed and which is preferable when assembling a multiplicity of conductors in a single assembly for cold welding, is supported in a horizontal plane upon ledges 31 of the supporting frame 20 as shown in Figure 7, and is positionable and removable from this frame by either sliding or lifting movements. This panel is provided with the openings 16 therein to permit the ends of the guide tubes to be snugly received therein flush with its top supporting surface "S′," while other slots or openings 14 permit the projection therethrough of the terminals 10 of electrical components 15 supported upon the bottom 19 of the frame in depressions 31 for locating the components relative to the panel openings and to positions where they can be welded to other electrical terminals or conductors. When so assembled, the terminals 10 of the electrical components will project upright through the openings 14 in the panel and above the top supporting surface as shown in Figures 1 and 2 ready to be bent or ironed down upon this supporting surface and ready for cleaning or other surface preparation to prepare them for welding in situ.

Figure 4:
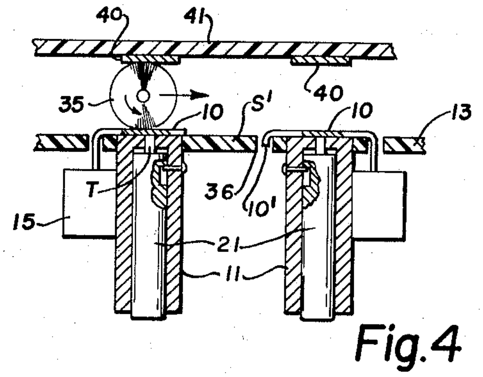
Figure 4 is a similar view with a second mounting panel arranged relative to a first panel and with the conductors of both panels being cleaned simultaneously with one pass of a cleaning instrument.

When all of the terminals 10 are to be bent down upon the panel to extend lengthwise in the same direction, a rotary wire scratch brush 35 or other surface preparing instrumentality can be moved across the supporting surface "S or S′" to engage and bend the terminals down upon the coplanar support formed by the upper ends of the guide tubes 11 and/or the top surface of the panel 13, and at the same time clean and scratch the surfaces of these terminals in preparation for their welding. In cases where all of the terminals do not extend in the same direction, as when they radiate from a center or extend crosswise of other terminals or in opposite directions, the free end of each terminal requiring protection against the instrumentality bending them in the wrong direction, is bent down as at 10′ to extend at an angle and into a recess 36 in the panel as shown in Figure 4, so that the wire brush or other instrumentality in passing over them will not distort the terminals and bend them out of the plane of the supporting surface, or in the wrong direction. This wire scratch brush may be power rotated as it is moved across the supporting surface to thoroughly clean the surfaces of the terminals which are to be welded to other superimposed terminals or conductors. In being bent and brushed down upon the supporting surface, these terminals will be supported in the common supporting plane by the ends of the guide tubes and/or the intervening portions of the panel.

Figure 5:
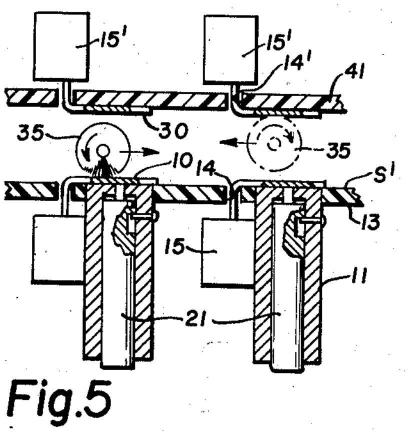
Figure 5 is a similar view with a second panel and its conductors arranged beyond a first pass of the cleaning instrument shown in full lines and in the path of the return pass of the instrument rotating in the opposite direction shown in dotted lines.

A second set of terminals, circuits or conductors 40 to be welded to the first set of terminals 10 may be mounted by a second panel 41 are laid upon the first set of terminals in position to be welded thereto. This second set of terminals may be separate terminals or conductors or they may be terminals or conductors of components or of a "printed" type of circuit used in television sets and produced by photographing the circuits 42 upon aluminated sheets mounted by the second panel or board 41 as shown in Figure 9. However, it is preferred that the circuits or terminals be stamped out of heavy foil as shown in Figure 11 and secured to the face of the second panel in any suitable manner with terminal portions 43 registering with the first set of terminals or conductors wherever they are to be welded to this first set of terminals. This second panel 41 may merely have conductors secured to its lower face and registering with the terminals of the first panel 13 wherever welds are to be made between the conductors of the two panels, or this second panel may also have openings 14′ for the extension of the terminals 30 of other components or conductors 15′ supported upon the upper face of the upper or second panel as shown in Figures 5 and 6. Such terminals 30 may, like the terminals of the components of the first panel, extend through the panel openings normal to its plane to be bent and have their surfaces prepared for welding by the same wire brush or instrumentality 35 which is used to bend and prepare the surfaces of the first set of terminals. This may be performed by arranging the second panel 41 with the terminals 30 of components 15′ spaced vertically above the reach of the preparing instrumentality 35 while it is passed in one direction to bend the terminals of the first set of terminals in one direction, after which the instrumentality 35 can be raised and moved back across the panel or in any other direction to engage and properly bend the second set of terminals 30 in the proper direction. It will be understood that the rotary wire scratch brush can be rotated either clockwise or counterclockwise to bend the terminals in the direction desired as the brush is moved across the plane of the supporting surface.

When the conductors 40 of the second panel 41 are merely fixed stationary conductors as shown in Figure 4, the second panel may be moved down close enough to arrange its conductors into the path of movement of the preparing instrumentality as it is being operated to bend and prepare the terminals 10 of the first set of components so that the complementary surfaces of the two sets of conductors or terminals to be welded together are simultaneously cleaned and prepared for the welding operation. After this cleaning operation, the cleaning instrumentality is moved beyond the confines of the panels so that the second panel 41 can be lowered to cause its contacts to be superimposed upon the contacts or terminals of the first panel ready for the welding operation. The rotary wire scratch brush may be power driven and manually supported and moved in the desired direction manually to bend the terminals in any direction which may be required to properly dispose the terminals in registering alignment with other conductors or terminals for subsequent welding.

The second panel 41 may be supported in any suitable manner for surface preparation of its conductors, and it may be supported in welding relation to the conductors of the first panel by means of pivoted supporting ledges 50 as shown in Figures 7 and 8. This second panel may be clamped in its assembled position with relation to the first set of terminals or panel by an suitable means, so that it will not be moved away from the first set of terminals by the welding pressure. When the welding plungers are moved to welding positions to indent and weld a first conductor 10 into a second conductor 30, such welding pressure is backed up by the panel itself, or a back-up anvil "A" may be moved into position in registration with the terminals or conductors to be welded to resist welding pressure. If desired, the second panel, if not strong enough to back up the welding operations, may have openings 51 therein disposed above its conductors to be welded whereby a reduced portion of a back-up anvil "A" may be inserted through such opening to rest against the conductor to be welded. Welding of these superimposed foil terminals occurs in the areas marked with an "X," and is caused by the indentor plungers 21 and 21′ being forced with great pressure against the superimposed foil conductors backed up by either a superimposed panel or by anvil means just described. All of the welding plungers and anvils may be simultaneously operated by placing the supporting frame 20 with the sandwiched panels properly arranged in a press and causing the head and platen of the press to approach to apply pressure simultaneously to the projecting ends of the plungers and anvils to cold weld all of the superimposed terminals or conductors with one stroke or welding effort.

Other assemblies may be made with a third panel 61 included in the dual sandwich panel assembly just described and it is supported upon pivoted ledges 50′ and clamped in welding position by suitable pivoted clamps 80 as shown in Figure 8. This third panel may mount other circuits 62 and electrical components with terminals 63 to be welded to those of the first and second panels as shown in Figure 8. As with these latter two panels, this third panel is rigid enough to form a back-up element or anvil against which the conductors may be pressed for cold pressure welding. This third panel may also have openings 64 through which the terminals of components 63 may be extended for welding to the conductors of the first and second panels and may have still other openings 65 through which welding indentors 66 may be moved down from the top thereof to weld conductors or terminals 63 of this third panel to conductors 10 and 30 of the second and/or first panels 13 and 41. In this instance, the intermediate panel 41 may also have openings 65 for the passage of welding indentors or back-up anvils to make welds between conductors sandwiched between any pair of panels and where crossover conductors 67 are necessary to connect circuits in rather inaccessible places in the sandwich assembly. The intermediate panel 41 in Figure 8 may have conductors or circuits on both upper and lower faces for the projection of conductors, terminals or the ends of the guide tubes 11 whereby the closed ends of the latter may be arranged flush with the upper face of the intermediate panel, as shown in Figure 8.

In all instances where the guide tubes of the welding apparatus extend through the various panels, the ends of such tubes are arranged flush with the supporting surface of the panel whereby the ends of these tubes and the welding tips "T" will form additional support for the bent-over terminals for their surface preparation. Figure 10 illustrates a crossover connection 70′ which is provided by equipping a panel with a pair of spaced openings 70 through which the ends 71 of a conductor arranged on one face of the panel are passed to be bent down upon the opposite face of the panel. To these free ends 71 of this conductor may be welded other conductors or terminals 72 so as not to interfere with the intermediate body portion 73 of the crossover conductor. Such crossover connections 70′ are also illustrated in Figure 8 showing some of them connected with the terminals or conductors of the first and second panels. In Figure 9, there is shown a network of electrical circuits mounted by one face of either the second or third panels. Terminal portions of these circuits to be attached to conductors of other components or panels are designated by the numerals 43; and if desired, these portions of the circuits may be made thicker and raised out of the plane of the circuit or panel to facilitate their welding to other conductors. This panel in Figure 9 is also shown provided with openings 14′ adjacent the various terminal contact portions for the extension of terminals from conductors or components on the other face of the panel and which are to be superimposed upon the terminal contacts for welding as described hereinbefore.

It is to be understood that all of the panels of the assembly are preferably made sufficiently rigid to form back-up elements to resist flexing of the panels and superimposed conductors during a welding operation and to form a substantially rigid mounting board or panel for the support of all circuits, conductors and components in a single sandwich unit capable of being handled in assembling it with other instruments. Due to the rigidity of the panels and the feasibility of the panels forming pressure applying and back-up elements or anvils against which the superimposed conductors are pressed for welding, it is possible that one or both of the panels may be bodily moved toward one another to apply a uniting or welding pressure to the superimposed conductors between the panels for uniting or cold pressure welding them together. In this instance, a minute or small slug might be positioned between each pair of foil conductors to be compressed and united or welded and which would be intimately united with both conductors by means of pressing the panels together in a plane with sufficient pressure to compress the slug and conductors into a homogeneous mass or cold pressure weld. By reason of the possibility of mounting a multiplicity of circuits, components and/or conductors between the layers of laminations of a sandwich structure, and the feasibility of cold pressure welding the conductors and terminals of various circuits in the small inaccessible spaces between various panels, very intricate electrical circuits with their components can be easily put together in a very compact unit susceptible of being readily installed in other instruments.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An apparatus for making an electrical assembly having a support member with an opening extending therethrough and having a first surface lying in a first plane with first and second electrical conductor materials thereon and cold welded together, said apparatus comprising a framework, a guide tube supported by said framework, said guide tube having an end surface, said guide tube adapted to reside in said opening of said support member with said end surface thereof substantially in said first plane, support means including said end surface of said guide tube for supporting the first and second electrical conductor materials, a welding plunger in said guide tube having an indentor adapted to be moved beyond said plane to indent and cold weld the first and second electrical conductor materials, means for backing up the first and second conductor materials, and means for moving said welding plunger in said guide tube.

2. An apparatus for making an electrical assembly having a support member with an opening extending therethrough and having a first surface lying in a first plane with first and second electrical conductor materials thereon and cold welded together, said apparatus comprising a framework, a guide tube supported by said framework, said guide tube having an end surface, said guide tube adapted to reside in said opening of said support member with said end surface thereof substantially in said first plane, support means including said end surface of said guide tube for supporting the first and second conductor materials, cleaning means for cleaning said electrical conductor materials, a welding plunger in said guide tube having an indentor adapted to be moved beyond said plane to indent and cold weld the first and second electrical conductor materials, means for backing up the first and second conductor materials, and means for moving said welding plunger in said guide tube.

3. An apparatus for making an electrical assembly having a support member with a plurality of openings extending therethrough and having a first surface lying in a first plane with first and second electrical conductor materials thereon and cold welded together, said apparatus comprising a base, a plurality of vertically extending guide tubes extending from said base, said guide tubes having upper end surfaces, said guide tubes adapted to reside in said openings of said support member with said upper end surfaces thereof substantially in said first plane, support means including said upper end surface of said guide tubes for supporting the first and second conductor materials, a welding plunger in each guide tube having an indentor adapted to be moved beyond said plane to indent and cold weld the first and second electrical conductor materials, anvil means for backing up said first and second conductor materials, and means for moving said welding plungers in said guide tubes.

4. An apparatus for making an electrical assembly having first and second support members having inner facing surfaces lying in first and second planes with first and second electrical conductor materials thereon cold welded together and forming an enclosure therebetween with each said first and second support members having an opening extending therethrough and providing first and second entranceways to said enclosure, said apparatus comprising a first and a second guide tube, said first and second guide tubes each having end surfaces, said first and second guide tubes adapted to reside in said first and second openings respectively with said upper end surfaces thereof substantially in said first and second planes of said respective facing surfaces, first support means including said end surface of said first guide tube for the first electrical conductor material, second support means including said end surface of said second guide tube for the second electrical conductor material, a welding plunger in each said first and second guide tubes having an indentor adapted to be moved respectively beyond said first and second planes to indent and cold weld the first electrical conductor material to the second electrical conductor material, and means for moving said welding plungers in said guide tubes.

5. Apparatus for making an electrical assembly including a framework, a plurality of guide tubes having end portions arranged substantially in a single plane, means including said end portions of said guide tubes for supporting a first plurality of conductors whereby a portion thereof extends beyond said plane, wire brush means for flattening said portions of said conductors substantially into said plane and cleaning the same, a welding plunger in each said guide tube and having an indentor to cold weld said first conductors to second conductors positioned adjacent thereto, means for backing up said first and second conductors during a welding operation, and means for substantially simultaneously moving said welding plungers in said guide tubes.

6. Apparatus for making an electrical assembly including a framework, a plurality of guide tubes having end portions arranged substantially at the same level, means for supporting a first plurality of conductors whereby a portion thereof extends beyond said level, mechanical cleaning means for flattening said portions of said conductors substantially to said level and cleaning the same, a welding plunger in each said guide tube and having an indentor to cold weld said first conductors to second conductors positioned adjacent thereto, means for backing up said first and second conductors during a welding operation, and means for moving said welding plungers in said guide tubes.

7. The method of making an electrical assembly including the steps of selecting an insulated support member, making a plurality of openings and a plurality of apertures through said support member, inserting first conductors through said apertures and above the surface of said insulated support member, passing a wire brush across said insulated support member to flatten said first conductors across said openings and to clean said first conductors, overlapping said first conductors with second conductors at said openings, backing up said overlapped first and second conductors and cold welding same at said openings.

8. The method of making an electrical assembly including the steps of selecting a support member, making a plurality of openings and a plurality of apertures through said support member, placing first conductors on the surface of said insulated support member across said openings, passing a brush across said first conductors to clean said first conductors, overlapping said first conductors with second conductors at said openings, backing up said overlapped first and second conductors and cold welding same at said openings.

9. An electrical assembly comprising first and second support members, said support members having inner facing surfaces forming an enclosure therebetween, said first support member having a first opening therethrough providing a first entranceway into said enclosure, said second support member having a second opening therethrough providing a second entranceway into said enclosure and being in line with said first opening, one of said support members having an aperture therethrough, a first electrical conductor material extending through said aperture into said enclosure and across said first and second openings in said first and second support members, a second electrical conductor material carried by the other of said first and second support members on said inner facing surface thereof, said first and second electrical conductor materials having portions overlapping each other within said enclosure and in line with said first and second openings, said overlapped portions of said first and second electrical conductor materials being connected by a cold weld in line with said first and second openings.

10. An electrical assembly comprising first and second support members, said support members having inner facing surfaces forming an enclosure therebetween, one of said support members having an opening therethrough providing an entranceway into said enclosure, each said support member having an aperture therethrough, an electrical conductor material extending through said apertures of each of said support members into said enclosure and across said opening in said one of said support members, said electrical conductor materials having portions overlapping each other within said enclosure where they cross said opening, said overlapped portions of said electrical conductor materials being connected by a cold weld in line with said opening.

11. An electrical assembly comprising first and second support members, said support members having inner facing surfaces forming an enclosure therebetween, one of said support members having an opening therethrough providing an entranceway into said enclosure, said first support member having an aperture therethrough, a first electrical conductor material extending through said aperture of said first support member into said enclosure and across said opening in said one of said support members, a second electrical conductor material carried by said second support member on said inner facing surface thereof, said first and second electrical conductor materials having portions overlapping each other within said enclosure and in line with said opening, said overlapped portions of said first and second electrical conductor materials being connected by a cold weld in line with said opening.

References Cited in the file of this patent

UNITED STATES PATENTS

| | | |
|---|---|---|
| 2,019,625 | O'Brien | Nov. 5, 1935 |
| 2,066,511 | Arlt | Jan. 5, 1937 |
| 2,433,384 | McLarn | Dec. 30, 1947 |
| 2,441,960 | Eisler | May 25, 1948 |
| 2,512,162 | Lips | June 20, 1950 |
| 2,692,321 | Hicks | Oct. 19, 1954 |
| 2,703,377 | Hings et al. | May 1, 1955 |
| 2,707,821 | Sowter | May 10, 1955 |

FOREIGN PATENTS

| | | |
|---|---|---|
| 493,523 | Canada | June 9, 1953 |